Aug. 21, 1928.
B. F. POTTER
1,681,430
DILUTING DEVICE FOR INTERNAL COMBUSTION ENGINES
Filed Sept. 5, 1925
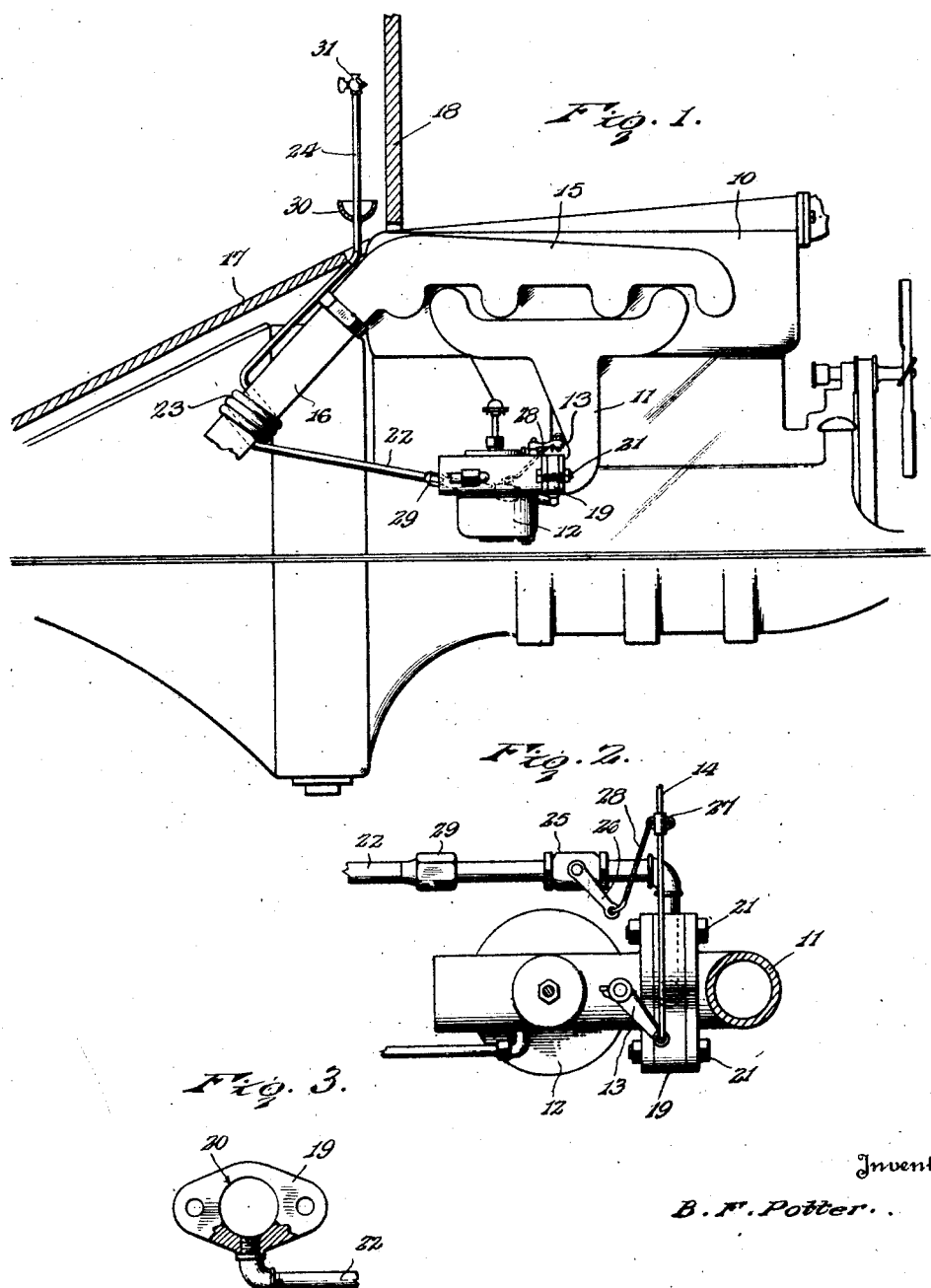
Inventor
B. F. Potter
By
Lacey & Lacey, Attorneys Patented Aug. 21, 1928.

1,681,430

UNITED STATES PATENT OFFICE.

BENJAMIN F. POTTER, OF ASHLAND, KENTUCKY.

DILUTING DEVICE FOR INTERNAL-COMBUSTION ENGINES.

Application filed September 5, 1925. Serial No. 54,844.

This invention relates to an improved diluting device for internal combustion engines and seeks, among other objects, to provide a device for diluting the fuel mixture with heated air to thus increase the combustibility of the mixture and consequently increase the efficiency of the engine as well as effect a material saving in the consumption of fuel.

The invention seeks, as a further object, to provide a device embodying means for controlling the intake of heated air in unison with the control of the fuel mixture.

A further and equally important object of the invention is to provide a device embodying means for facilitating the starting of the engine in cold weather.

Another object of the invention, in this connection, is to provide means for cutting off the intake of air at the intake end of the air intake pipe employed so that, when starting, a rich fuel mixture will be delivered to the engine.

Still another object is to provide means whereby the intake end of the intake pipe may be heated so that the air trapped in the end portion of the pipe by the closing of the valve may, in turn, be heated to be subsequently introduced into the fuel mixture, when the valve is opened, while additional air taken in will be heated by said end portion of the pipe and thus introduced into the mixture to facilitate starting.

And the invention seeks, as a still further object, to provide a device which may be readily installed and which will be well adapted for general use.

Other objects not above specifically mentioned will appear in the course of the following description.

In the accompanying drawings:

Figure 1 is a side elevation showing my improved device in connection with a motor vehicle engine.

Figure 2 is a fragmentary plan view particularly showing the auxiliary air valve and its connection with the throttle valve.

Figure 3 is a detail elevation partly broken away and shown in section to illustrate the connection of the air intake pipe with the spacer block employed.

Referring now more particularly to the drawings, I have shown a conventional motor vehicle engine at 10. The intake manifold of the engine is indicated at 11 and the carbureter at 12. This carbureter is provided with the usual throttle valve operated by a lever 13, and connected to said lever is the customary operating rod 14. The exhaust manifold of the engine is indicated at 15, and detachably connected to the rear end of said manifold is the usual exhaust pipe 16. The floor of the vehicle is indicated at 17 and the dash at 18.

In carrying the invention into effect, I employ an insert plate or block 19 which is interposed between the intake manifold 11 and carbureter 12 of the engine and is shaped to conform to the contour of the confronting flanges thereof. As shown in Figure 3, the block is provided with a central opening 20 to register with the passages of the carbureter and manifold, and extending through the block and through said flanges are bolts 21 rigidly securing the parts together.

Connected at one end with the block 19 at its lower side to communicate with the opening 20 through the block is an air intake conduit 22 which is bent to form a coil 23 surrounding the upper end of the exhaust pipe 16, whence said conduit is continued upwardly and forwardly over the rear end of the exhaust manifold 15 close thereto and terminates in a vertically disposed standpipe 24 extending upwardly through the floor 17 of the vehicle at the rear of dash 18 in parallel spaced relation to the dash. Interposed in the lower end portion of said conduit to lie between the engine and carbureter is a suitable control valve 25 which may be of the butterfly type and the valve disc of which is operated by a lever 26. Fixed to the operating rod 14 is a clamp 27 and extending between said clamp and said lever is a link 28. Thus, when the rod 14 is shifted, the levers 13 and 26 will be swung in unison.

Interposed in the conduit 22 a short distance above the valve 25 is a union 29 which is provided to facilitate the assemblage of the device, and suitably fixed to the lower end portion of the standpipe 24 is a fuel cup 30 surrounding said pipe. Fixed to the upper terminal of the pipe is a valve 31 and, as will be appreciated, this valve is located within easy reach of the driver of the vehicle when occupying the driver's seat, for manually operating the valve.

In starting the engine, the valve 31 is closed so that no air can flow through the conduit 24 to the passage 20 of the block 19 into the intake manifold 11, with the result that an undiluted or rich fuel mixture will be drawn from the carbureter 12 into said manifold.

After the engine has been in operation a short time, the exhaust gases flowing from the exhaust manifold 15 through the pipe 16 will, of course, heat said pipe with the result that the coil 23 of the conduit 22 will be heated so that, under normal running conditions, a flow of heated auxiliary air will be supplied through said conduit to the intake manifold for heating and diluting the fuel mixture. A material saving in the consumption of fuel will thus be effected while, also, the combustibility of the mixture will be enhanced to increase the efficiency of the engine. Furthermore, since the valve 25 is connected with the throttle valve to be operated in unison therewith, adjustment of the throttle valve will effect a corresponding adjustment of the auxiliary air valve so that auxiliary air will be admitted in ratio to the flow of the fuel mixture.

In very cold weather, a quantity of fuel may be poured into the cup 30 and ignited to heat the standpipe 24 before starting the engine. Closing of the valve 31 will, of course, serve to trap air in the standpipe so that, when the standpipe is heated, such air will also be heated and retained against escape by the valve. When the valve 31 is opened and the engine started, the heated air in the standpipe 24 will be drawn into the intake manifold by engine suction and thus introduced into the rich fuel mixture flowing from the carbureter for warming the mixture. Furthermore, additional air taken in for a short period after the valve 31 is opened will be heated by the standpipe 24 as the air flows through said standpipe and is thence conducted to the intake manifold for heating the fuel mixture. The combustibility of the mixture will thus be materially increased with the result that quick starting and efficient running of the engine will be effected.

Attention is now directed to the fact that the standpipe is located rearwardly of the dash 18 and is, therefore, housed within and protected by the vehicle body. Accordingly, the dash and adjacent walls of the vehicle body will shield said standpipe from dust so that under ordinary conditions only pure fresh air will be taken in through said pipe. Furthermore, in thus locating the pipe, the pipe is protected from any air drafts such as might be set up by the fan of the vehicle engine and will also be protected from any air currents such as might be stirring in the surrounding atmosphere. Thus, when fuel is introduced into the cup 30 and ignited, the flame will, instead of being blown away from the standpipe 24, rise upwardly about the standpipe for heating the standpipe, and since the fuel cup is located above the vehicle floor within the vehicle body, the floor and dash serve as partitions located between the cup and engine for reducing the hazard incident to the possibility of ignition of fuel or fuel gases at the carbureter. It is important that the valve 31 be located at or near the upper end of the standpipe above the fuel cup 30 since, in thus locating the valve, it is possible to trap a quantity of air in the standpipe which may be heated when the fuel in the fuel cup is ignited, as previously noted. Furthermore, in placing the valve at the intake end of the pipe above the cup, it is possible to heat the valve as well as the pipe so that the valve may assist in heating the air subsequently drawn through the pipe when the valve is opened.

Having thus described the invention, what I claim is:

In combination with a motor vehicle including an engine provided with a fuel mixture inlet and an exhaust, and a body provided with a floor board and a dash, an auxiliary air intake pipe communicating with said fuel mixture inlet and extending adjacent the exhaust to be heated therefrom with an end portion projecting upwardly through the floor board adjacent the dash, a control valve adjacent the upper end of said pipe adapted to be manually opened and closed, and a receptacle carried by the upwardly extending portion of said pipe above the floor board and shielded by the dash and adapted to contain fuel for preliminary heating of the pipe.

In testimony whereof I affix my signature.

BENJAMIN F. POTTER. [L. S.]